J. PARKER.
DOUBLETREE HOOK.

No. 179,339. Patented June 27, 1876.

Witnesses:
Charlie L. Ford
H. B. Hale

Inventor:
Josiah Parker
By G. W. Ford
Atty.

UNITED STATES PATENT OFFICE.

JOSIAH PARKER, OF BELVIDERE, ASSIGNOR TO HIMSELF AND THOMAS B. SILVIUS, OF FLORA, ILLINOIS.

IMPROVEMENT IN DOUBLE-TREE HOOKS.

Specification forming part of Letters Patent No. 179,339, dated June 27, 1876; application filed January 10, 1876.

*To all whom it may concern:*

Be it known that I, JOSIAH PARKER, of Belvidere, in the county of Boone and State of Illinois, have invented a new and useful Improvement in Double-Trees or Eveners; and I do hereby declare that the following is a full and exact description of the same, reference being had to the accompanying drawings, and to the letters of reference marked thereon.

Figure 1:
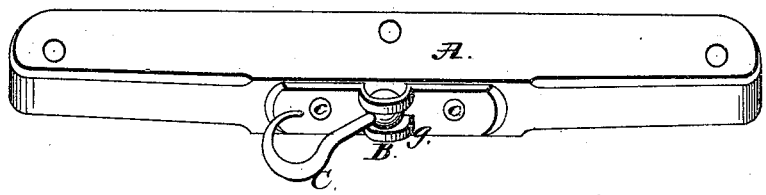
Figure 3:
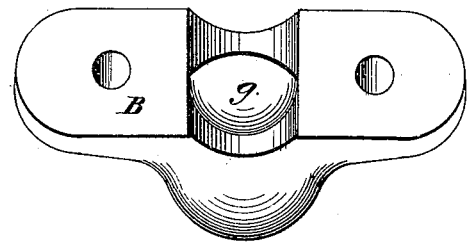
Figure 2:
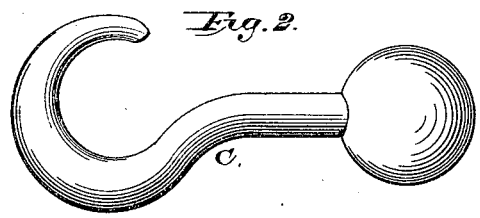

Figure 1 is a plan view of my improved double-tree. Fig. 2 is a view of the socket draft-piece, in which the hook swivels; and Fig. 3 is a view of the draft-hook detached.

Similar letters of reference denote corresponding parts in each figure.

The object of the invention is to provide a cheap and practical hook, to remain at all times attached to the double-tree, for the convenience of changing the team from wagon to plow, and vice versa, without necessitating the attaching of a clevis, or detaching the same when forming the connection between the double-tree and the implement to be drawn.

For use on wagons, sleighs, &c., double-trees are provided with a hole in the center, through which a draft-pin passes, for the purpose of securing the double-tree to the pole; but when the team is to be hitched to a plow, harrow, or other implements where a pole is not used, a different connection must be made. This connection is ordinarily made by using one or more clevises, and in such use a clevis-pin takes the place of the hammer-strap draft-pin, so that in changing work often several implements or attaching devices must be used. To obviate this my invention has been made, wherein all the different attachments required are embodied in one and the same implement.

In the drawings, A represents the double-tree or evener-bar; B, the socket draft-piece, having the elongated slot $g$, and in which the round-headed hook C swivels and moves. $c$ $c$ are bolts, which pass through the double-tree and socket draft-piece, and by which the draft-irons are secured to the double-tree or evener-bar.

When the hook C is to be attached to the evener by a wrought-iron connection a flat bar of the required width and thickness is used. A slot is cut longitudinally of sufficient length and width to give free play to the hook laterally, as well as allowing it to swivel. In the center of the socket-piece B an outward curve or semicircle is made, which leaves sufficient space between the socket and evener-bar for the rounded head of the hook C, as shown at $b$, Fig. 1.

When cast or cast malleable iron is used, the socket-plate B is made with the longitudinal slot through the semicircular center, but with concave recesses in the side next to the evener-bar, as shown in Fig. 2.

The hook C is made of the shape shown in Fig. 3. The head of the hook is round or ball-shaped, having a round shank next to the ball, thus giving a lateral as well as rotary movement to the said hook. When the double-tree is to be attached to a wagon or other vehicle having a hammer-strap, the hook can be swung to one side of the center and out of the way of the said hammer-strap.

I am aware that headed hooks have been made with the head inclosed in a socket, thus made to swivel in the well-known manner; also, with a hinged shank, for giving a lateral movement; but I am not aware that swiveled and vibrating hooks have been made by the use of an elongated slotted plate and ball-headed hook.

What I claim as my invention, and desire to secure by Letters Patent, is—

The combination of the evener-bar A, the socket B, having the slot $g$, and the rigid hook C, provided with the round or ball-shaped head, all arranged and operating as described.

This specification signed and witnessed this 17th day of September, 1875.

JOSIAH PARKER.

Witnesses:
G. W. FORD,
CHARLES S. FORD.